United States Patent
Ando

[19]

[11] Patent Number: 5,991,063
[45] Date of Patent: Nov. 23, 1999

[54] OPTICAL SCANNING DEVICE

[75] Inventor: Toshinori Ando, Inagi, Japan

[73] Assignee: Canon Kabushiki Kaisha, Tokyo, Japan

[21] Appl. No.: 08/844,873

[22] Filed: Apr. 22, 1997

[30] Foreign Application Priority Data

Apr. 22, 1996 [JP] Japan .................................. 8-124020

[51] Int. Cl.⁶ ................................................ G02B 26/08
[52] U.S. Cl. ............................................ 359/204; 347/241
[58] Field of Search ........................... 359/204; 347/233, 347/236, 241

[56] References Cited

U.S. PATENT DOCUMENTS

| | | |
|---|---|---|
| 4,812,861 | 3/1989 | Sasaki et al. . |
| 5,233,188 | 8/1993 | Arimoto et al. .................... 359/214 |
| 5,276,463 | 1/1994 | Andrews . |
| 5,295,148 | 3/1994 | Mori et al. ............................ 372/46 |
| 5,371,526 | 12/1994 | Appel et al. . |
| 5,805,199 | 9/1998 | Aoki ....................................... 359/204 |

FOREIGN PATENT DOCUMENTS

| | | |
|---|---|---|
| 0 464 556 | 1/1992 | European Pat. Off. . |
| 0 697 782 | 2/1996 | European Pat. Off. . |
| 61-118716 | 6/1986 | Japan . |
| 62-227667 | 10/1987 | Japan . |
| 3-68915 | 3/1991 | Japan . |

*Primary Examiner*—Cassandra Spyrou
*Assistant Examiner*—Darren E. Schuberg
*Attorney, Agent, or Firm*—Fitzpatrick, Cella, Harper & Scinto

[57] ABSTRACT

An optical scanning device includes a light source having a plurality of light-emitting portions, a deflector for deflecting a plurality of light beams emitted by the light source, optical elements for guiding the plurality of light beams emitted by the light source toward the deflector and an imaging element for guiding the plurality of light beams deflected by the deflector onto a surface to be scanned. A polarization limiting element is inserted in an optical path between the light source and the deflector so as to limit directions of polarization of the plurality of light beams.

22 Claims, 4 Drawing Sheets

OPTICAL SCANNING DEVICE

BACKGROUND OF THE INVENTION

1. Field of the Invention

The present invention relates to an optical scanning device and, more particularly, to an optical scanning device suitable for an apparatus such as a laser beam printer (LBP) or the like, which records an image by optically scanning a photosensitive body surface as the surface to be scanned with a plurality of light beams (bundles of rays), which are emitted by a plurality of light-emitting portions of a light source means, and are guided toward the photosensitive body surface via a light deflector such as a rotary polygonal mirror or the like.

2. Related Background Art

As a conventional optical scanning device for attaining high-speed printing, a multi-beam optical scanning device has been proposed and manufactured. Such multi-beam optical scanning device has a plurality of light-emitting portions (laser tips) as a light source means, and simultaneously optically scans a recording medium surface with a plurality of beam spots which are formed on the recording medium surface by imaging a plurality of light beams emitted by the plurality of light-emitting portions by an imaging lens via a light deflector.

In order to attain high-speed printing using only one beam spot (light beam), the number of times of optically scanning the recording medium surface per unit time must be very large, and as a consequence, the rotational speed of the light deflector, image clocks, and the like cannot follow such large number of times of optical scanning. Accordingly, if the number of beam spots that simultaneously scan the recording medium surface is increased, the rotational speed of the light deflector, image clocks, and the like decrease in inverse proportion to the number of beam spots.

As the most efficient method of forming a plurality of beam spots, a laser element serving as a light source has a plurality of light-emitting points (light-emitting portions) which can be driven independently. Such laser element having a plurality of light-emitting point s is generally called a "monolithic multi-beam laser element". When the monolithic multi-beam laser element is used, various optical elements arranged after the light source can be commonly used by the plurality of light beams, thus providing large merits in terms of cost, working, adjustments, and the like.

The monolithic multi-beam laser elements include, e.g., a so-called surface-emission laser (surface-emission type semiconductor laser).

The surface-emission laser emits a light beam in a direction parallel to the direction of thickness of a silicon layer, while a conventional semiconductor laser emits a light beam in a direction perpendicular to the direction of thickness of the silicon layer, and the surface-emission laser has the following feature. That is, the conventional semiconductor laser emits divergent light, which has an elliptic section and suffers large variations in divergent angle, while the surface-emission laser can emit a circular beam having a stable divergent angle.

However, the surface-emission laser has a problem, i.e., has an unstable direction of polarization of the output light beam. Although the direction of polarization can be controlled to some extent by the manufacturing method, the direction of polarization fluctuates depending on variations in units of light-emitting points, ambient temperature, and outputs.

Normally, the reflectances, transmittances, and angle characteristics of optical elements that build the optical scanning device, e.g., a polygonal mirror as a light deflector, a scanning lens (f-θ lens) as an imaging optical system, a return mirror for changing the optical path, and the like change depending on the direction of polarization of the input light beam.

For this reason, when a monolithic multi-beam laser element comprising a surface-emission laser is used as the light source of the optical scanning device, a plurality of beam spots that optically scan the recording medium surface have different intensities in correspondence with the different directions of polarization of the individual light-emitting points, and such differences in intensity appear as pitch nonuniformities on an image, thus considerably deteriorating the image quality.

SUMMARY OF THE INVENTION

It is an object of the present invention to provide an optical scanning device which comprises a polarization limiting means for limiting directions of polarization of a plurality of light beams in an optical path between a light source means and a deflection means so that the reflectances, transmittances, and the like of optical elements after the polarization limiting means can have equal characteristics with respect to the plurality of light beams, and light quantity differences in units of beam spots can be eliminated.

It is another object of the present invention to provide an optical scanning device which can obtain both p- and s-polarized light components by polarizing the directions of polarization of light beams emitted by a plurality of light-emitting portions in nearly a 45° direction with respect to the main scanning direction.

It is still another object of the present invention to provide an optical scanning device which comprises a light quantity detection means for detecting the intensities of a plurality of light beams emitted by a plurality of light-emitting portions of a light source means in an optical path between a light limiting means and a deflection means, and a control means for controlling the light source means on the basis of the detected values obtained from the light quantity detection means so that the plurality of light beams that have passed through the polarization limiting means have equal intensities, thereby suppressing variations in light quantity of the plurality of light beams.

According to the present invention, in an optical scanning device in which a plurality of light beams are emitted by a light source means having a plurality of light-emitting portions, are guided toward a deflection means via an optical means, and the plurality of light beams deflected by the deflection means are guided onto a surface to be scanned via an imaging means, so as to simultaneously optically scan the surface to be scanned with the plurality of light beams, a polarization limiting means for limiting directions of polarization of the plurality of light beams is inserted in an optical path between the light source means and the deflection means.

The optical scanning device of the present invention especially has the following features:

the polarization limiting means is formed integrally with an optical element that makes up the optical means;

the polarization limiting means is pivotally held by a holding member;

the light source means is controlled by control means so that the plurality of light beams that have passed through the polarization limiting means have equal intensities;

the intensities of the plurality of light beams emitted by the light source means are detected by light quantity detection means in an optical path between the polarization limiting means and the deflection means;

a light quantity detection means for detecting the intensities of the plurality of light beams emitted by the light source means is inserted in an optical path between the polarization limiting means and the deflection means, and the light source means is controlled by a control means on the basis of the detected values obtained from the light quantity detection means, so that the plurality of light beams that have passed through the polarization limiting means have equal intensities;

the plurality of light beams emitted by the plurality of light-emitting portions are polarized in a substantially 45° direction with respect to the main scanning direction;

the polarization limiting means is inclined with respect to the optical axis of the optical means;

the light source means comprises a monolithic multi-beam laser element comprising a surface-emission laser;

the polarization limiting means comprises a polarizer; and the optical means has a collimator lens and a cylindrical lens.

According to the present invention, in an optical scanning device in which a plurality of light beams are emitted by a light source means having a plurality of light-emitting portions, are guided toward a deflection means via an optical means, and the plurality of light beams deflected by the deflection means are guided onto a surface to be scanned via an imaging means, so as to simultaneously optically scan the surface to be scanned with the plurality of light beams, a polarization limiting means for limiting directions of polarization of the plurality of light beams is inserted in an optical path between the light source means and the deflection means, a light quantity detection means for detecting intensities of the plurality of light beams emitted by the light source means is inserted in an optical path between the polarization limiting means and the deflection means, and the light source means is controlled by control means so that the plurality of light beams that have passed through the polarization limiting means have equal intensities.

The optical scanning device of the present invention especially has the following features:

the polarization limiting means is formed integrally with an optical element that makes up the optical means;

the polarization limiting means is pivotally held by a holding member;

the plurality of light beams emitted by the plurality of light-emitting portions are polarized in a substantially 45° direction with respect to the main scanning direction;

the polarization limiting means is inclined with respect to the optical axis of the optical means;

the light source means comprises a monolithic multi-beam laser element comprising a surface-emission laser;

the polarization limiting means comprises a polarizer; and the optical means has a collimator lens and a cylindrical lens.

DETAILED DESCRIPTION OF THE PREFERRED EMBODIMENTS

Figure 1:
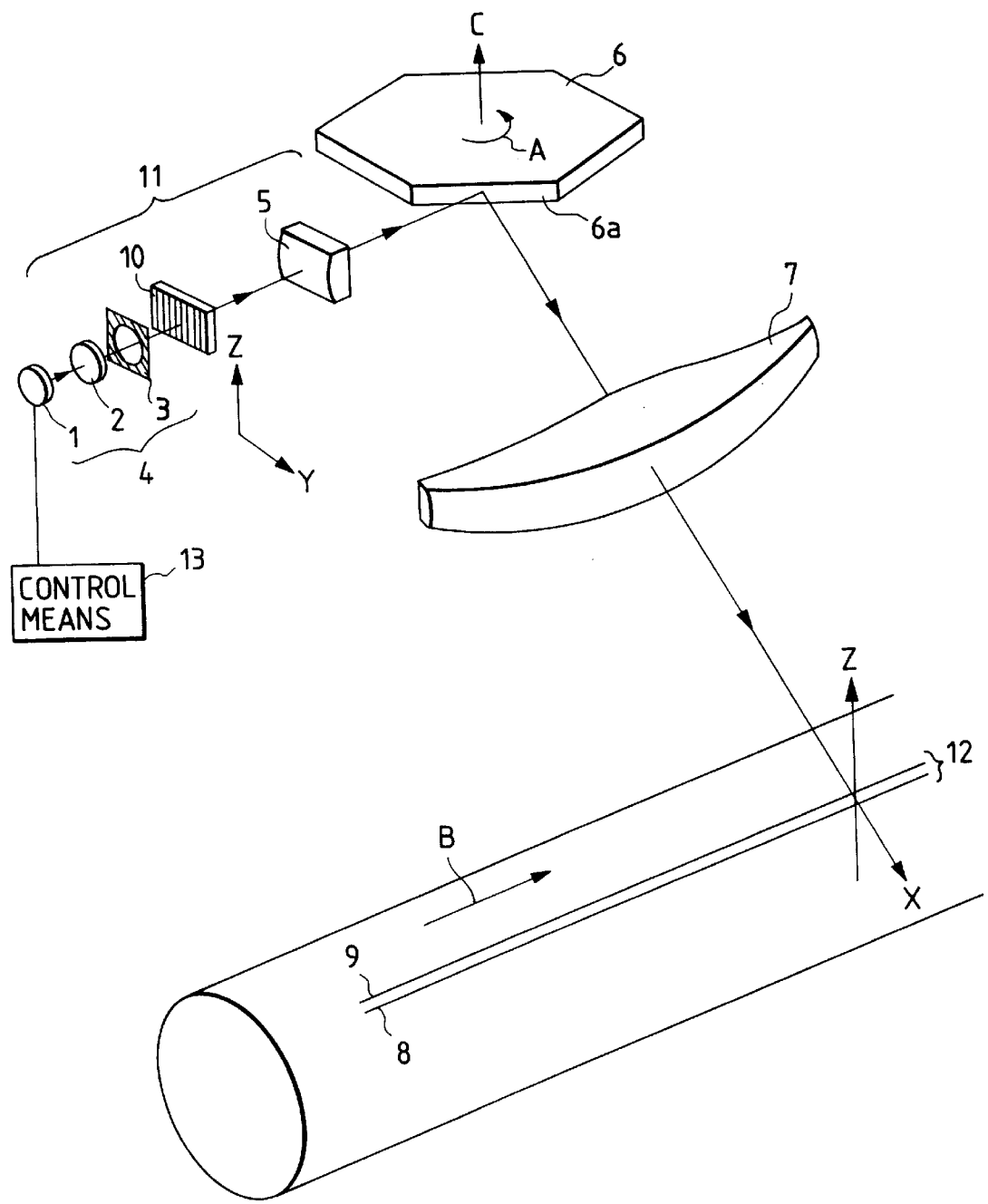
FIG. 1 is a schematic view showing principal part of an optical scanning device according to the first embodiment of the present invention.

FIG. 1 is a schematic view showing principal part of an optical scanning device used in a laser beam printer apparatus according to the first embodiment of the present invention.

Referring to FIG. 1, a monolithic multi-beam laser element 1 serves as a light source means, and comprises a surface-emission laser. The surface-emission laser 1 has a plurality of light-emitting portions (laser tips) in the direction of an arrow Z (sub-scanning direction) in FIG. 1, and the light beams emitted by the plurality of light-emitting portions are polarized in a substantially 45° direction with respect to the main scanning direction (the direction of an arrow Y in FIG. 1) perpendicular to the optical axis direction and the sub-scanning direction (Z-direction). The plurality of light-emitting portions can be subjected to light modulation independently.

A collimator lens 2 converts the plurality of light beams (bundles of rays) emitted by the surface-emission laser 1 into collimated light beams or light beams having a predetermined divergence or convergence angle. An aperture 3 shapes the outer shapes of the light beams. Note that these elements, i.e., the surface-emission laser 1, the collimator lens 2, and the aperture 3 constitute a light source unit 4. The light source unit 4 outputs a plurality of light beams which have similar outer shapes and divergent or convergent angles, but the angles of polarization (directions of polarization) of the individual light beams do not agree with each other.

A polarizer (polarization plate) 10 serves as a polarization limiting means, and is inserted in the optical path between the light source means 1 and a deflection means 6 (to be described later). The polarizer 10 has an optical function of passing only polarized light components in a predetermined direction. More specifically, the polarizer 10 of this embodiment serves to pass only specific polarized light components of the incident light beams, so that the reflectances, transmittances, and the like of the individual optical elements after the polarizer 10 can have equal characteristics with respect to the plurality of light beams, thereby eliminating light quantity differences in units of beam spots.

An anamorphic lens (cylindrical lens) 5 has a positive refractive power in only the sub-scanning direction. Note that the collimator lens 2 and the cylindrical lens 5 are elements to constitute an optical means 11.

A light deflector 6 serves as a deflection means, and comprises, e.g., a polygonal mirror. The light deflector 6 is rotated by a driving unit (not shown) in the direction of an arrow A in FIG. 1 at a constant rotational speed.

A scanning lens system 7 serves as an imaging means, and comprises a single anamorphic lens (scanning lens) using a plastic aspherical surface. The scanning lens 7 has, in a scanning plane (main scanning direction), so-called f-θ characteristics for imaging light beams which are deflected and incident at equal angular velocities into beam spots that move at equal velocities on scanning lines 8 and 9 (to be described later). Also, the scanning lens 7 has, in the sub-scanning direction perpendicular to the scanning plane, a so-called tilt correction function of setting an imaging relationship between the deflection surface (polygonal mirror surface) illuminated with the light beams focused by the above-mentioned cylindrical lens 5 in the sub-scanning direction, and the surface to be scanned. Note that the scanning plane indicates a light beam section which is time-serially formed by the light beams deflectively reflected by the deflection surface of the light deflector.

The scanning lines 8 and 9 correspond to the two light beams emitted by the two light-emitting portions. When the optical scanning device is mounted in, e.g., a laser beam printer apparatus as an image forming apparatus using an electrostatic copying mechanism, these scanning lines 8 and 9 match a photosensitive body surface (the surface to be scanned) 12 as the recording medium.

In this embodiment, a plurality of light beams emitted by the surface-emission laser 1 having the plurality of light-emitting portions, which can be independently subjected to optical modulation, are converted into nearly collimated beams by the collimator lens 2, and their outer shapes are limited by the aperture 3. Thereafter, predetermined polarized light components of the light beams pass through the polarizer 10 and are linearly imaged on a deflection surface 6a of the light deflector (polygonal mirror) 6 via the cylindrical lens 5. The plurality of light beams deflectively reflected by the deflection surface 6a are guided onto the surface to be scanned (photosensitive body surface) 12 via the scanning lens 7, thus forming beam spots. When the light deflector 6 is rotated in the direction of the arrow A, the surface 12 to be scanned is scanned with multiple beams in the direction of the arrow B, thus performing image recording on the photosensitive drum surface as the recording medium.

Figure 2:
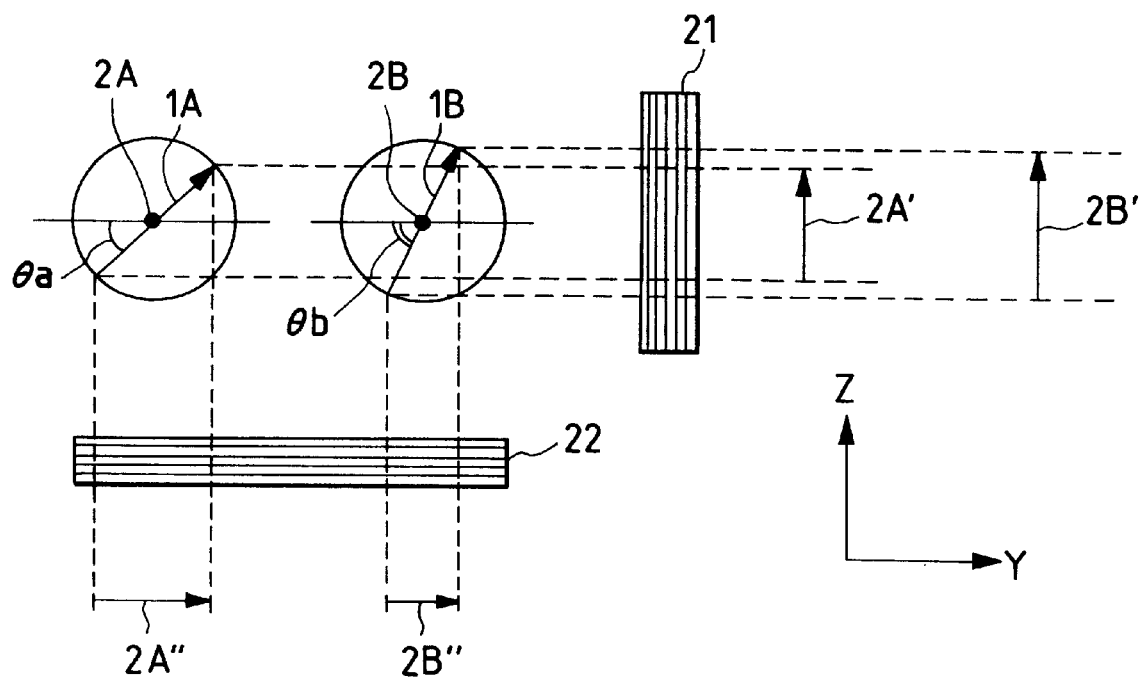
FIG. 2 is an explanatory view showing a light source and polarized light components that have passed through a polarizer in the first embodiment of the present invention.

FIG. 2 is an explanatory view showing the directions of polarization of light beams emitted by a plurality of light-emitting points of the surface-emission laser shown in FIG. 1, and the directions of polarization and the amplitudes of the light beams that have passed through the polarizer.

In FIG. 2, the direction of polarization when viewed from the propagation direction of the light beam is indicated by the direction of an arrow, and the amplitude of the light beam is indicated by the length of the arrow. In FIG. 2, polarizers 21 and 22 (corresponding to the polarizer 10 in FIG. 1) are depicted as parallel stripe patterns with respect to the directions of polarization that can pass. The polarizer 21 in FIG. 2 passes only polarized light in the sub-scanning direction, and the polarizer 22 passes only polarized light in the main scanning direction.

Light-emitting points (light-emitting portions) 2A and 2B are formed on the surface-emission laser 1. The directions of polarization of the light beams emitted by the two light-emitting points 2A and 2B are respectively indicated by arrows 1A and 1B, and these two polarized light components have tilts of angles θa and θb with respect to the main scanning direction, if the direction parallel to the plane of drawing of FIG. 2 is defined as the main scanning direction. The multi-beam laser element is preferably manufactured so that these angles θa and θb are about 45° with respect to the main scanning direction. However, these angles vary with errors of about ±20° due to manufacturing errors and the like.

When the polarizer 21 that passes only polarized light in the sub-scanning direction is used for a plurality of light beams emitted by the light-emitting points 2A and 2B in FIG. 2, these light beams have polarized states, as indicated by arrows 2A' and 2B' shown in FIG. 2. Note that the polarizer itself produces light losses in practice, but such light losses are equally produced in the two light beams and are not expressed here. At this time, the two light beams having the polarized states 2A' and 2B' are polarized in only the sub-scanning direction, and have amplitudes sinθa and sinθb, which are different from each other.

Similarly, when the polarizer 22 that passes only polarized light in the main scanning direction is used for the light beams, these light beams have polarized states, as indicated by arrows 2A" and 2B" shown in FIG. 2. At this time, the two light beams having the polarized states 2A" and 2B" are polarized in only the main scanning direction, and have amplitudes cosθa and cos θb, which are different from each other.

In general, whether the direction of polarization of a light beam in a single scanning system is to agree with the main scanning direction or sub-scanning direction is determined depending on the surface reflection characteristics of the optical elements that build the scanning system.

For example, since reflection by the light deflector (polygonal mirror) and refraction by the scanning lens mostly occur within the scanning plane, if the direction of polarization agrees with the main scanning direction, the optical elements primarily have reflection characteristics of p-polarized light; if the direction of polarization agrees with the sub-scanning direction, the optical elements primarily have reflection characteristics of s-polarized light. For example, when the scanning lens surface is not coated with any film, light losses upon reflection by the scanning lens surface decrease as the incident angle becomes larger within the practical range in the case of p-polarized light; but they increase in the case of s-polarized light. The light deflector preferably has a constant reflectance independently of the reflection angle, and in order to realize such characteristics, the reflection surface is coated with, e.g., a metal film. However, the characteristics to be imparted differ in correspondence with the p- or s-polarized light components, and the characteristics to be used are determined by, e.g., the manufacturing method of a film.

On the other hand, such optical scanning device normally uses a plurality of mirrors to bend the optical path of the scanning system. The reflectances and angle characteristics of these mirrors also differ depending on the directions of polarization of incident light beams.

Figure 3:
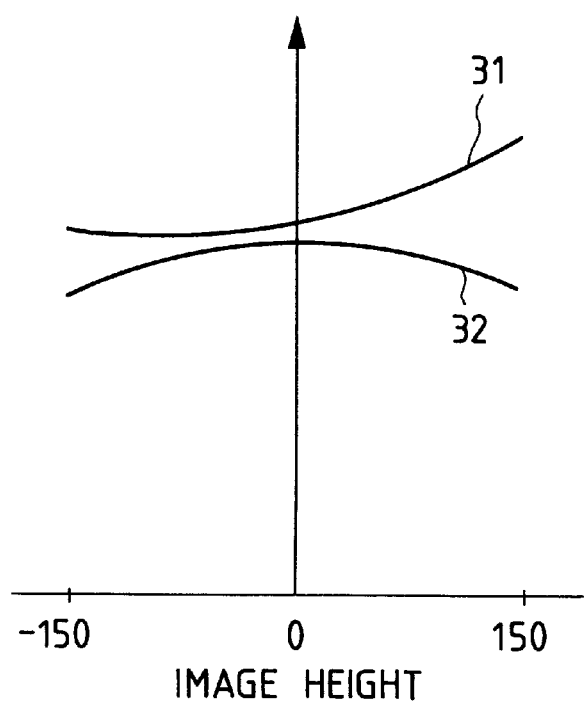
FIG. 3 is an explanatory view showing the intensity distribution of scanning lines formed by two light beams having different directions of polarization.

In this state, for example, when two light beams having different directions of polarization are imaged on the surface to be scanned via the above-mentioned optical elements, the light quantity distributions (intensity distributions) at the scanning positions (image heights) of the scanning lines 8 and 9 formed by these beams are expressed by light quantity distribution curves 31 and 32 shown in FIG. 3. These distributions cause changes in density in units of scanning lines, and considerably deteriorate the image quality.

In view of this problem, in this embodiment, since the above-mentioned polarizer 21 or 22 is inserted in the optical path between the surface-emission laser 1 and the light deflector 6 in consideration of the surface reflection characteristics and the like of the individual optical elements that make up the scanning system, the directions of polarization of the two light beams are limited to one direction, and changes in reflectance depending on the field angles are equalized between the two light beams, thereby eliminating light quantity differences in units of beam spots.

In FIG. 2, the two light beams that have passed through the polarizer (21, 22) have the same direction of polarization but have different amplitudes. When multi-beam scanning is made in this state, the two scanning lines have different exposures on the photosensitive body surface and form density pitch nonuniformity, thus impairing the image quality.

However, in practice, the intensities (light quantities) of the plurality of light beams are measured by a measurement means in the optical path between the polarizer 10 and the photosensitive body surface 12, and a control means 13 (laser drive circuit) individually controls (adjusts) the light-emission intensities of the plurality of light-emitting portions so that the measurement means can obtain equal measured values.

Note that the light-emission intensities of the light-emitting portions may be adjusted during assembly of the optical scanning device or may be adjusted by performing, e.g., feedback control during operation of the optical scanning device.

In this embodiment, since the plurality of light beams emitted by the plurality of light-emitting portions have polarized light components in both the main scanning direction and sub-scanning direction perpendicular to the main scanning direction, the subsequent refraction, reflection, and the like can be obtained from both the p- and s-polarized light components depending on the angle of the polarizer 10.

Figure 4:
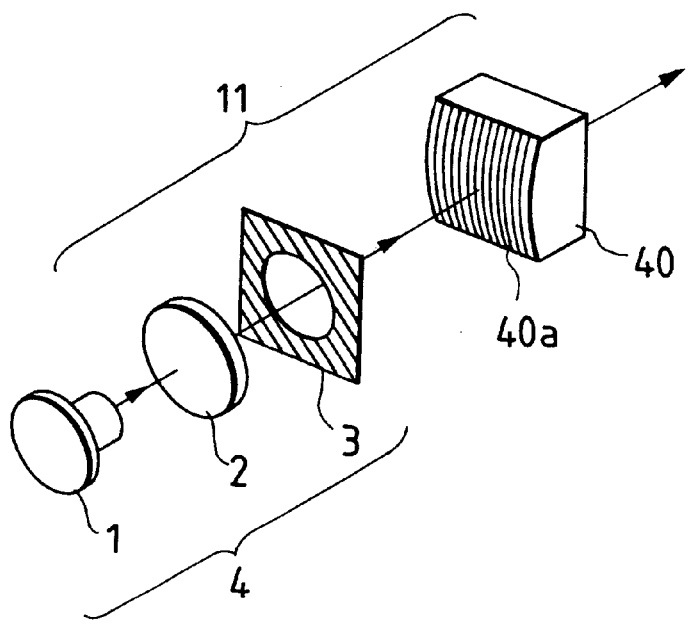
FIG. 4 is a schematic view showing principal part of the second embodiment of the present invention.

FIG. 4 is a schematic view showing principal part of the second embodiment of the present invention. The same reference numerals in FIG. 4 denote the same parts as in FIG. 1.

In this embodiment, the difference from the first embodiment described above is that the polarization limiting means and the cylindrical lens that makes up the optical means are integrally formed, and the lens surface of the cylindrical lens has a function of a polarizer. Other arrangements and optical effects are substantially the same as those in the first embodiment described above, thereby obtaining the same effect.

More specifically, in FIG. 4, a cylindrical lens 40 is formed with a film that has a function of a polarizer on its lens surface 40a on the side of the light source unit 4.

As described above, in this embodiment, since the polarization limiting means is formed integrally with the cylindrical lens 40, the number of parts can be reduced, thus making the entire device compact.

In this embodiment, the cylindrical lens 40 has the function of the polarizer. Alternatively, other optical elements that make up an optical means 11, e.g., the collimator lens 2, may have a function of a polarizer.

Figure 5:
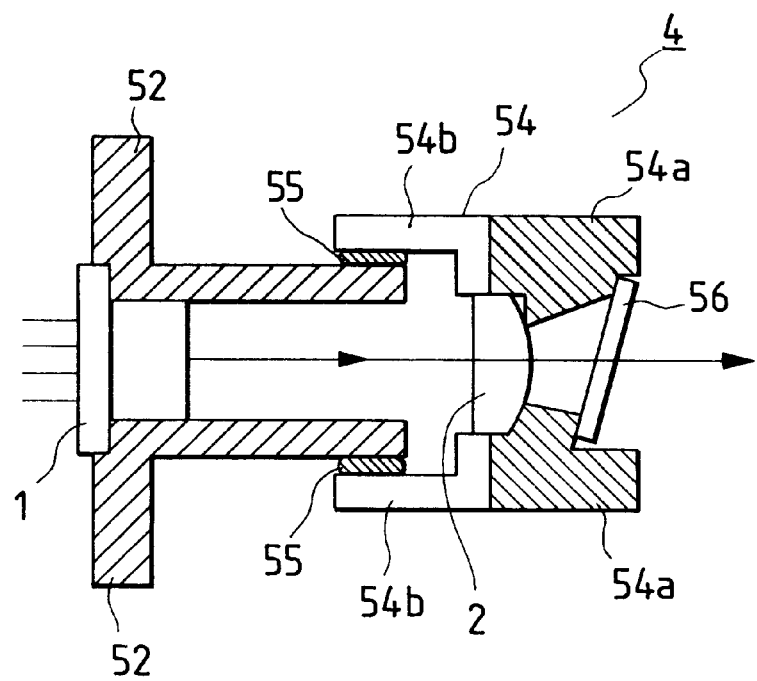
FIG. 5 is a schematic view showing principal part of the third embodiment of the present invention.

FIG. 5 is a schematic view showing principal part of the third embodiment of the present invention. The same reference numerals in FIG. 5 denote the same parts as in FIG. 1.

In this embodiment, the difference from the first embodiment described above is that the polarizer (polarization plate) is integrated with the light source unit, and is tilted from a direction perpendicular to the optical axis of the collimator lens. Other arrangements and optical effects are substantially the same as those in the first embodiment described above, thereby obtaining the same effect.

More specifically, in FIG. 5, a polarizer (polarization plate) 56 is held by a collimator lens holder 54 as a holding means (to be described later), and is tilted not in a direction perpendicular to the optical axis of the collimator lens 2 but in a predetermined direction. A light source holder 52 holds the surface-emission laser 1 as the light source. The collimator lens holder 54 is formed by plastic two-color molding, and a hatched portion 54a in FIG. 5 is made up of a light-shielding material. The opening of the hatched portion 54a serves as an aperture. The remaining white portion is a transparent portion 54b. An ultraviolet-curing adhesive 55 is applied between the transparent portion 54b and the light source holder 52, and ultraviolet rays are irradiated via the transparent portion 54b, thus joining the collimator lens holder 54 to the light source holder 52.

As described above, in this embodiment, since the polarizer 56 is integrated with the light source unit 4 and is tilted from the direction perpendicular to the optical axis of the collimator lens 2, the entire device can be rendered compact. Also, even when light beams emerging from the collimator lens 2 are reflected by the polarizer 56, the reflected light beams can be prevented from returning to the surface-emission laser 1 via the collimator lens 2 again, thus stabilizing the operation of the surface-emission laser 1.

In this embodiment, the polarizer 56 is integrated with the light source unit 4, and is tilted with respect to the optical axis of the collimator lens 2. However, the present invention is not limited to such specific arrangement. For example, the polarizer 56 may be arranged independently of the light source unit 4, and may be tilted from the direction perpendicular to the optical axis.

Figure 6:
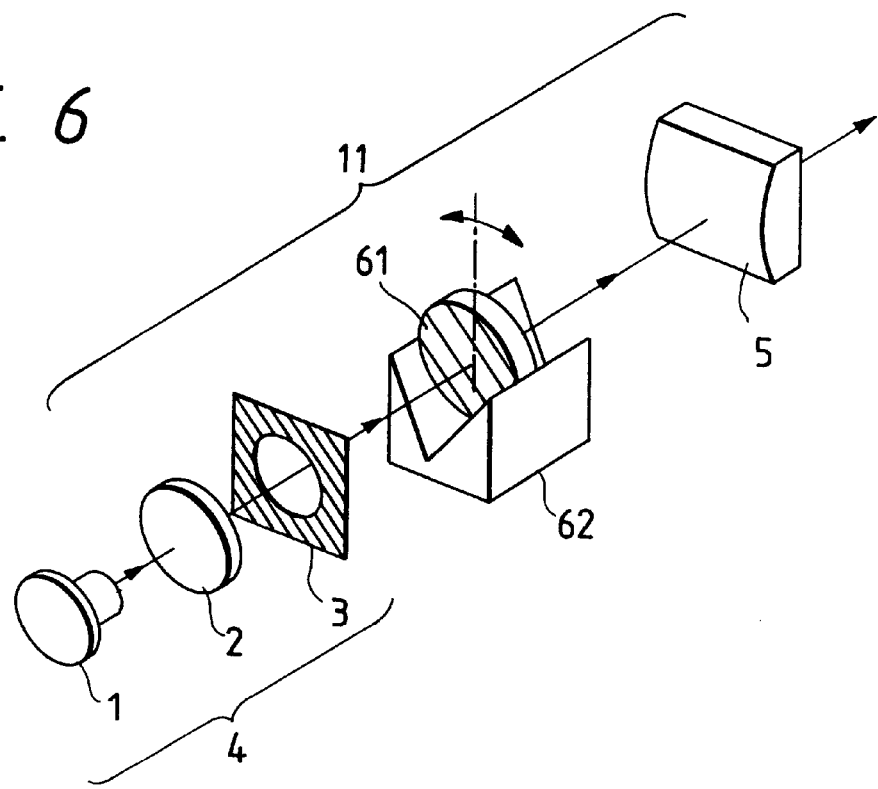
FIG. 6 is a schematic view showing principal part of the fourth embodiment of the present invention.

FIG. 6 is a schematic view showing principal part of the fourth embodiment of the present invention. The same reference numerals in FIG. 6 denote the same parts as in FIG. 1.

In the present invention, the direction of the polarizer need only be basically selected to obtain nearly constant exposures on the photosensitive body surface in consideration of the characteristics of optical members present in the optical path between the light deflector and the photosensitive body surface (the surface to be scanned).

In this embodiment, a polarizer 61 serving as a polarization limiting means is pivotal about the optical axis of the collimator lens 2 to effectively select the direction of the polarizer 61. The polarizer 61 is shaped to have a cylindrical shape, and is held by a holding member 62 with a V-shaped groove.

With this arrangement, in this embodiment, a light deflector (not shown) is rotated while producing light beams, and the light quantity distributions (intensity distributions) of the scanning lines (line images) on the surface to be scanned are measured by a measurement means (not shown). The polarizer 61 is rotated and adjusted by a predetermined angle based on signals obtained from the measurement means so as to obtain nearly constant light quantity distributions of the scanning lines. After the adjustments, the polarizer 61 is adhered and fixed to the holding member 62.

Figure 7:
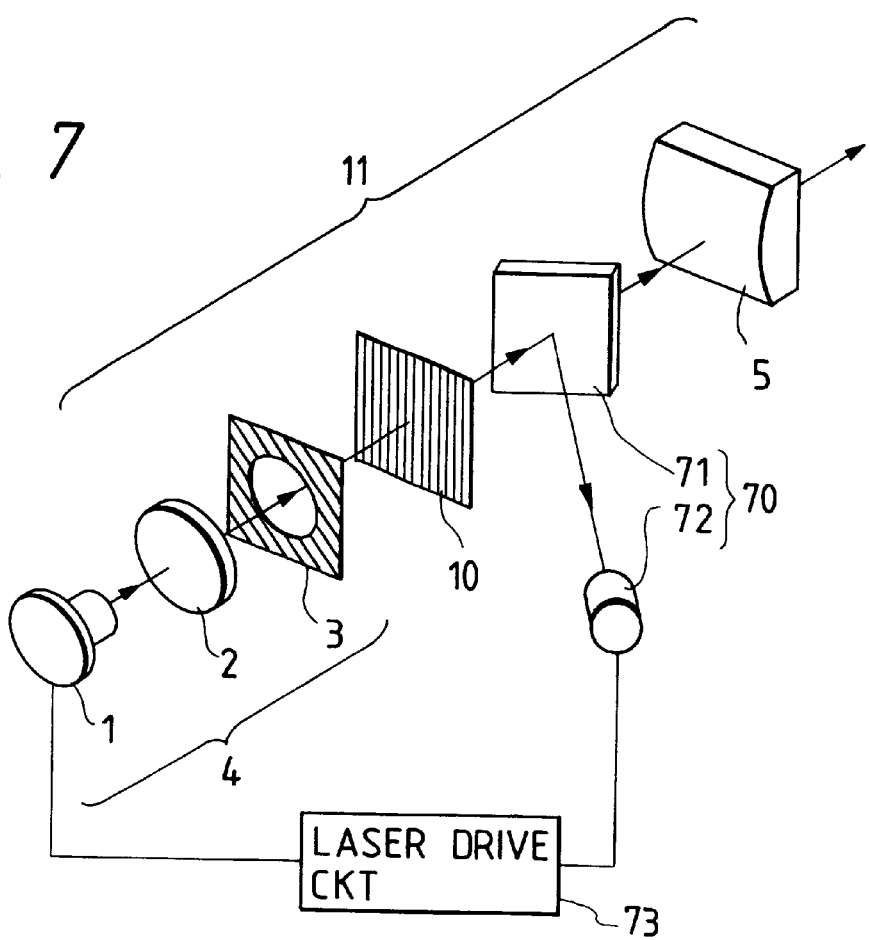
FIG. 7 is a schematic view showing principal part of the fifth embodiment of the present invention.

FIG. 7 is a schematic view showing principal part of the fifth embodiment of the present invention. The same reference numerals in FIG. 7 denote the same parts as in FIG. 1.

In this embodiment, the difference from the first embodiment described above is that a light quantity detection means for detecting the light quantities (intensities) of a plurality of light beams is inserted between the polarization limiting means and the deflection means, and feedback control is made based on the signals detected by the light quantity detection means, thereby suppressing variations in light quantity of the plurality of light beams. Other arrangements and optical effects are substantially the same as those in the first embodiment described above, thereby obtaining the same effect.

More specifically, in FIG. 7, a light quantity detection means 70 comprises a half mirror 71 inserted in the optical path between the polarizer 10 and the cylindrical lens 5, and a light quantity sensor 72 for detecting the light quantity of a light beam reflected by the half mirror 71.

In this embodiment, the light-emitting portions (light-emitting points) of the surface-emission laser 1 are caused to flicker in turn, and some light components of a light beam emitted by each light-emitting portion are reflected by the half mirror 71 via the collimator lens 2, aperture 3, and polarizer 10 to be guided toward the light quantity sensor 72. The light quantity sensor 72 detects the light quantity of each light beam. Then, a laser drive circuit 73 serving as a control means individually controls the light-emission intensities of the plurality of light-emitting portions based on the signals obtained by the light quantity sensor 72, so that the light quantities of the plurality of light beams equal a predetermined quantity. With this control, variations in light quantity of the plurality of light beams can be suppressed, thus obtaining high-quality line images.

According to the present invention, as described above, since the polarization limiting means for limiting the directions of polarization of a plurality of light beams is inserted in the optical path between the light source means and the deflection means, the reflectances, transmittances, and the like of optical elements after the polarization limiting means can have equal characteristics with respect to the plurality of light beams, thus achieving an optical scanning device that can eliminate light quantity differences in units of beam spots.

Also, according to the present invention, as described above, since the directions of polarization of light beams emitted by the plurality of light-emitting portions are limited to a substantially 45° direction with respect to the main scanning direction, an optical scanning device that can obtain both p- and s-polarized light components can be achieved.

Furthermore, according to the present invention, since the light quantity detection means for detecting the intensities of a plurality of light beams emitted by the plurality of light-emitting portions is inserted in the optical path between the polarization limiting means and the deflection means, and the control means controls the light source means on the basis of the detected values obtained from the light quantity detection means so that the plurality of light beams that have passed through the polarization limiting means have equal intensities, variations in light quantity of the plurality of light beams can be suppressed, thus achieving an optical scanning device that can obtain high-quality line images.

What is claimed is:

1. An optical scanning device comprising:
   light source means having a plurality of light-emitting portions, said light source means comprising a monolithic multi-beam laser element;
   deflection means for deflecting a plurality of light beams emitted by said light source means;
   optical mans for guiding the plurality of light beams emitted by said light source means toward said deflection means;
   imaging means for guiding the plurality of light beams deflected by said deflection means onto a surface to be scanned; and
   polarization limiting means, inserted in an optical path between said light source means and said deflection means, for limiting directions of polarization of the plurality of light beams.

2. A device according to claim 1, wherein said polarization limiting means is formed integrally with an optical element that makes up said optical means.

3. A device according to claim 1, wherein said polarization limiting means is pivotally held by a holding member.

4. A device according to claim 1, wherein said light source means is controlled by control means so that intensities of the plurality of light beams that have passed through said polarization limiting means match each other.

5. A device according to claim 1, wherein intensities of the plurality of light beams emitted by said light source means are detected by light quantity detection means in an optical path between said polarization limiting means and said deflection means.

6. A device according to claim 5, wherein said light source means is controlled by control means based on detected values obtained from said light quantity detection means so that intensities of the plurality of light beams that have passed through said polarization limiting means match each other.

7. A device according to claim 1, wherein the plurality of light beams emitted by said plurality of light-emitting portions are respectively polarized in a substantially 45° direction with respect to a main scanning direction.

8. A device according to claim 1, wherein said polarization limiting means is tilted with respect to an optical axis of said optical means.

9. A device according to claim 2, wherein said monolithic multi-beam laser element comprises a surface-emission laser.

10. A device according to claim 1, wherein said polarization limiting means comprises a polarizer.

11. A device according to claim 1, wherein said optical means has a collimator lens and a cylindrical lens.

12. A laser beam printer apparatus comprising:
   light source means having a plurality of light-emitting portions, said light source means comprising a monolithic multi-beam laser element;
   deflection means for deflecting a plurality of light beams emitted by said light source means;
   optical means for guiding the plurality of light beams emitted by said light source means toward said deflection means;
   a recording medium;
   imaging means for guiding the plurality of light beams deflected by said deflection means onto a surface of said recording medium; and
   polarization limiting means, inserted in an optical path between said light source means and said deflection means, for limiting directions of polarization of the plurality of light beams.

13. An apparatus according to claim 12, wherein said polarization limiting means is formed integrally with an optical element that makes up said optical means.

14. An apparatus according to claim 12, wherein said polarization limiting means is pivotally held by a holding member.

15. An apparatus according to claim 12, wherein said light source means is controlled by control means so that intensities of the plurality of light beams that have passed through said polarization limiting means match each other.

16. An apparatus according to claim 12, wherein intensities of the plurality of light beams emitted by said light source means are detected by light quantity detection means in an optical path between said polarization limiting means and said deflection means.

17. An apparatus according to claim 16, wherein said light source means is controlled by control means based on detected values obtained from said light quantity detection means so that intensities of the plurality of light beams that have passed through said polarization limiting means match each other.

18. An apparatus according to claim 12, wherein the plurality of light beams emitted by said plurality of light-emitting portions are respectively polarized in a substantially 45° direction with respect to a main scanning direction.

19. An apparatus according to claim 12, wherein said polarization limiting means is tilted with respect to an optical axis of said optical means.

20. An apparatus according to claim 12, wherein said monolithic multi-beam laser element comprises a surface-emission laser.

21. An apparatus according to claim 12, wherein said polarization limiting means comprises a polarizer.

22. An apparatus according to claim 12, wherein said optical means has a collimator lens and a cylindrical lens.

* * * * *

UNITED STATES PATENT AND TRADEMARK OFFICE
CERTIFICATE OF CORRECTION

PATENT NO. : 5,991,063

DATED : November 23, 1999

INVENTOR(S) : TOSHINORI ANDO

Page 1 of 2

It is certified that error appears in the above-identified patent and that said Letters Patent is hereby corrected as shown below:

COLUMN 1:
    Line 41, "point s" should read --points--.

COLUMN 3:
    Line 65, "part" should read --parts--.

COLUMN 4:
    Line 7, "part" should read --parts--;
    Line 9, "part" should read --parts--;
    Line 11, "part" should read --parts--;
    Line 13, "part" should read --parts--; and
    Line 19, "part" should read --parts--.

COLUMN 6:
    Line 14, "sinea" should read --$\sin\theta a$--.
    Line 15, "sineb" should read --$\sin\theta b$--.
    Line 22, "cosea" should read --$\cos\theta a$--.

UNITED STATES PATENT AND TRADEMARK OFFICE
CERTIFICATE OF CORRECTION

PATENT NO. : 5,991,063

DATED : November 23, 1999

INVENTOR(S) : TOSHINORI ANDO

It is certified that error appears in the above-identified patent and that said Letters Patent is hereby corrected as shown below:

COLUMN 7:
    Line 34, "part" should read --parts--; and
    Line 58, "part" should read --parts--.

COLUMN 8:
    Line 32, "part" should read --parts--; and
    Line 59, "part" should read --parts--.

COLUMN 9:
    Line 62, "mans" should read --means--.

Signed and Sealed this

Twenty-sixth Day of September, 2000

Attest:

Q. TODD DICKINSON

*Attesting Officer*     *Director of Patents and Trademarks*